July 19, 1938.　　A. W. TOURNAY-HINDE　　2,124,090

LANTERN SLIDE DISSOLVING VIEW PROJECTOR

Filed Nov. 3, 1936　　3 Sheets-Sheet 1

INVENTOR
ARTHUR WILLIAM TOURNAY-HINDE
By Young, Emery & Thompson
ATTORNEYS

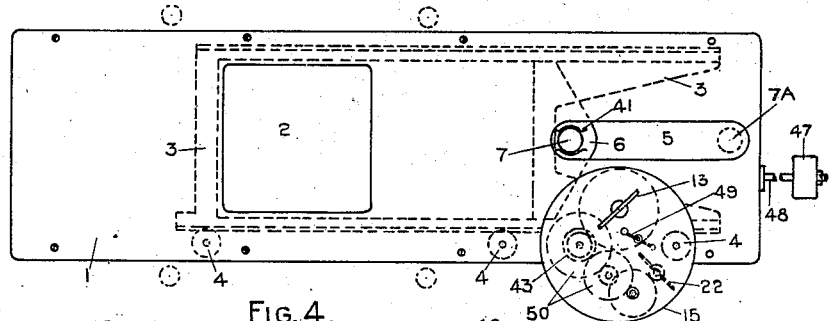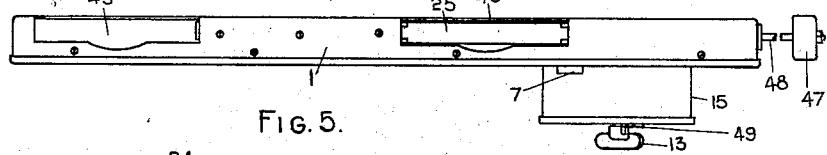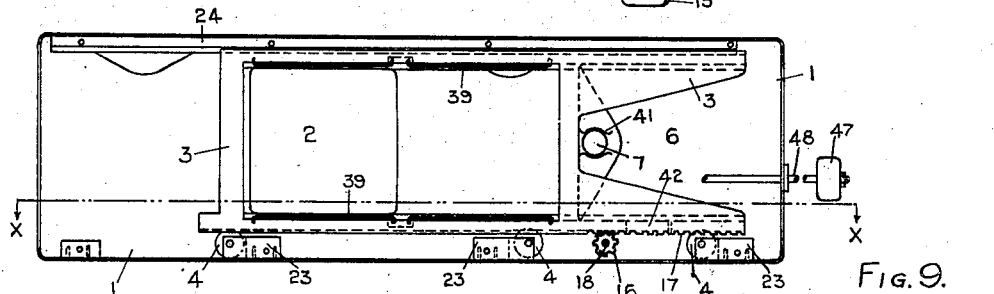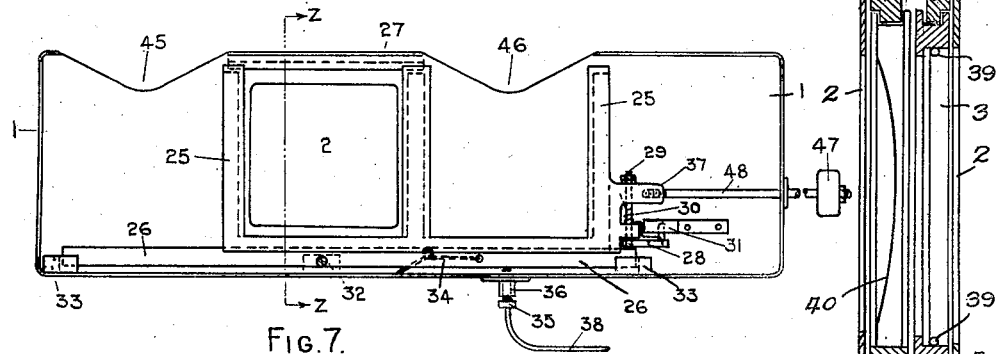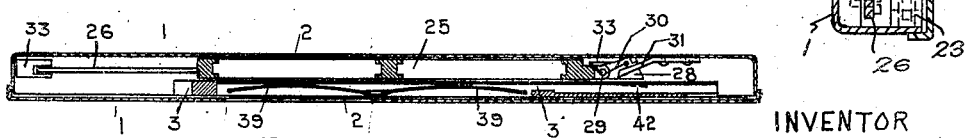

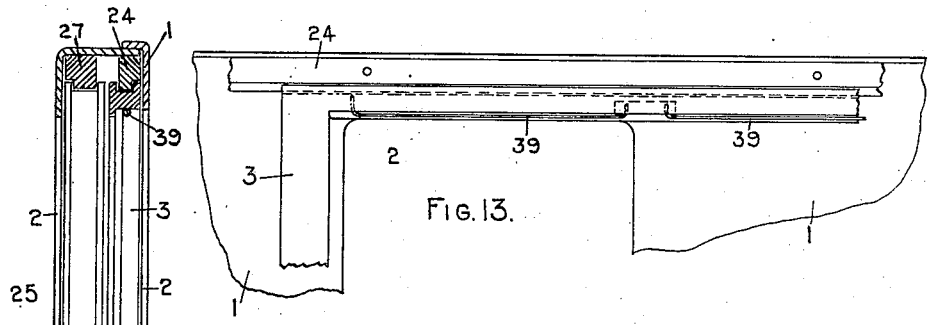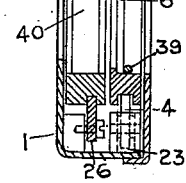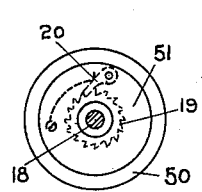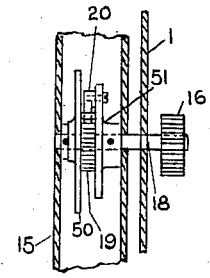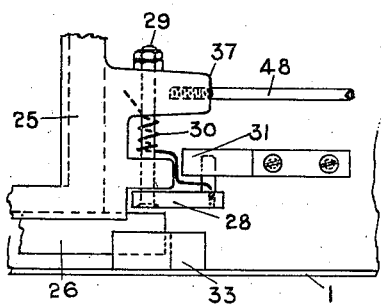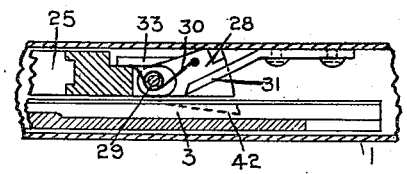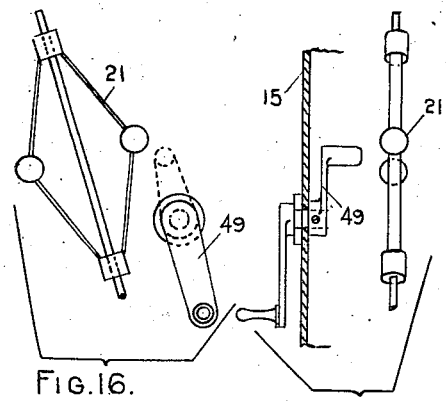

Patented July 19, 1938

2,124,090

UNITED STATES PATENT OFFICE 2,124,090

LANTERN SLIDE DISSOLVING VIEW PROJECTOR

Arthur William Tournay-Hinde, Sydney, New South Wales, Australia, assignor to Animated Slides Limited, Canberra, Australia, a company of Australia Application November 3, 1936, Serial No. 109,051
In Australia December 17, 1935

12 Claims. (Cl. 88—26)

This invention relates to improvements in apparatus for exhibiting slides by means of projected light upon a screen. In this class of apparatus, it is possible to use "still" slides and yet show animation or movement in the picture depicted upon the screen. The apparent movement is due to two or more pictures being drawn upon the lantern slide of which only one picture can show at any one moment, the remaining pictures that do not show being obscured by means of a transparent screen having opaque lines so arranged upon it as to show the pictures which are on the lantern slide alternately or in sequence, the lines on the screen blanking out the pictures or picture that are not showing at any particular moment. The slide carrier, as usual, contains two cells, and is movable manually to bring either cell into the path of the light beam.

The transparent screen having opaque lines upon it is traversed across the light beam in front of the slide carrier. In the arrangements as at present known the screen is driven mechanically in one direction. At the end of its traverse movement it has to be returned to its original position by hand independently of the slide carrier, and to do this the mechanical connection between the motor and the screen carrier has to be disengaged in order to permit of the return of the screen carrier.

The transparent screen with the opaque lines upon it, is located in the machine on that side of the machine next to the theatre picture screen and the slide carrier is located immediately behind it, viz. between the transparent opaque lined screen and the source of illumination. As is well known the lines on the picture slide are focussed upon the picture theatre screen, and therefore are visible, but the opaque lines on the transparent screen are thus out of focus and are not appreciably visible.

The present invention consists in an arrangement whereby reversal of the traverse movement of the screen carrier is effected automatically by the movement of the slide carrier to or fro to register the one or the other of its cells with the path of the light beam, and in improved forms of motors and means for traversing the screen carrier across the light beam.

The movement of the slide carrier and the screen carrier may be either a horizontal one or a vertical one, or if necessary, angular. These differences in the direction of movement are partly consequent on differences in the design of the lanterns or lamp houses used in theatres for showing films and lantern slides, and upon the style of animation required upon the picture theatre screen.

In carrying out my invention the screen carrier is driven in one direction by a suitable motor. I prefer to use a spring driven motor to actuate the screen carrier. The mechanical connection between the motor and the screen carrier may be a flexible tape or chain or a rack and pinion or both. The speed of movement of the screen carrier may be controlled by a fly governor, such as is frequently used in controlling the striking train of a clock, or by a centrifugal governor, similar to that on a gramophone motor. In order to show a series of picture slides upon the picture screen, the slide carrier has to be moved to and fro so that each slide in turn registers with the aperture through which the light beam passes. In my invention this movement of the slide carrier automatically maintains the transverse movement of the screen across the light beam, by alternately returning the screen carrier to its starting position by means of a pawl engagement between the slide carrier and the screen carrier.

When the apparatus is arranged for vertical movement the weight of the slide carrier and screen in descending may be utilized as the motive power for operating the screen.

Referring now to the drawings:

Figure 4 shows a front elevation of another form of a machine constructed according to this invention;

Figure 5 shows a view of the top of the machine in Figure 4;

Figure 6 shows an interior view of Figure 4 with the front cover omitted;

Figure 7 shows another interior view, in which the front cover is omitted and the screen carrier removed;

Figure 8 is a section approximately along the line X—X;

Figure 9 is a section approximately along the line Z—Z;

Figure 10 shows an enlarged view of Figure 9;

Figure 11 shows an enlarged elevation of the means whereby the slide carrier through the screen carrier automatically re-tensions the motor spring;

Figure 12 shows a plan of Figure 11;

Figure 13 shows an enlarged view of a portion of Figure 6;

Figure 14 shows an enlarged elevation of the ratchet mechanism of the gear assembly of Figure 1;

Figure 15 shows an end view of Figure 14;

Figure 16 shows an enlarged elevation of the governor brake; and

Figure 17 shows an end view of Figure 16.

Figure 1:
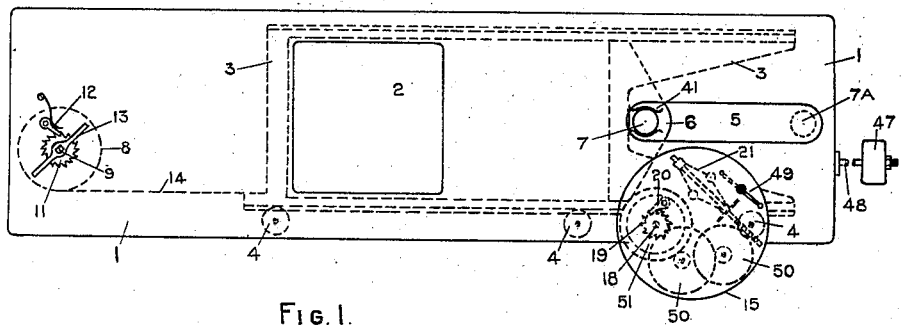
Figure 1 shows a front elevation of a machine constructed according to this invention.
Figure 2:
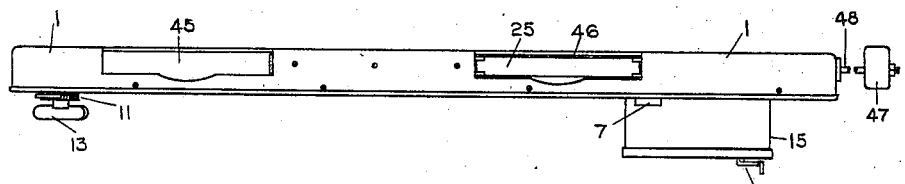
Figure 2 shows a view of the top of the machine in Figure 1.

Figures 7, 8, and 9 are applicable for reference to machines as shown in Figure 1 or Figure 4. All parts in all the figures are identified by the same numbers where applicable. The complete machine takes the place of the usual slide carrier apparatus used in lantern picture projection, and the dissolving or animated pictures produced upon the picture theatre or other screen can be used for amusement, advertising or other purposes.

Reference will now be made to Figure 1. The machine is enclosed in a case 1. There is an aperture 2 right through the front and back of the case 1 through which the beam of light from the lamp house projects the pictures upon the theatre screen. The dotted outline 3 is the carrier for the transparent screen 6 with opaque vertical lines, the carrier 3 being supported on rollers 4. A slotted opening 5 in the front of the case 1 gives access to the transparent screen 6. It is at times necessary to show ordinary "still" slides as "still" pictures upon the picture theatre screen, and to effect this the aperture 2 through which the picture is shown must be clear and not obscured by a screen. In order to withdraw the screen 6 from obscuring the aperture 2 the screen 6 is constructed so as to seat freely within the screen carrier 3, and the screen carrier 3 is of greater length than the screen 6. An attachment 7 on the screen 6 enables the screen 6 to be moved longitudinally to the right in the screen carrier 3 to the position 7a. The screen 6 can thus be moved to the right independently of the screen carrier 3 for a sufficient distance to enable it to clear the aperture 2. A detent spring 41 is provided to latch the screen 6 at one end of its travel in screen carrier 3.

A barrel 8 mounted on arbor 9 contains a spring 10. The arbor 9 has a ratchet wheel 11 and pawl 12 fitted in the usual manner to maintain tension of the spring 10 when wound. The tension is adjusted by the key 13. A flexible metal tape or other suitable flexible connection 14 connects the periphery of barrel 8 with the screen carrier 3. The spring barrel 8 and connecting tape 14 to screen carrier are shown more clearly in Figure 3.

15 is a case containing a gear train with wheels and pinions 50 of suitable proportions, the gear wheels and pinions 50 being indicated by dotted circles. A pinion 16 gears with a rack 17 on the under side of the screen carrier 3, and this pinion 16 drives the arbor 18 by means of a pawl 20 engaging a ratchet wheel 19 so arranged that when the screen carrier 3 is traversed to the right it turns the pinion 16 clockwise causing the pawl 20 mounted on disc 51 to slip over the ratchet wheel 19 (see Figures 14 and 15). In traversing the screen carrier 3 to the right, the flexible connection 14 revolves barrel 8 and partially winds up the spring 10 therein. The tension of the spring 10 is transmitted by flexible connection 14 to the screen carrier 3 and screen 6, and thus traverses it across the aperture 2 to the left, and the speed of travel is controlled through the gear train in case 15, by either a governor, similar to a gramophone or other governor, or by a fly fan similar to that used in the striking train of a clock. In Figure 1 a governor 21 is shown for this purpose, and in Figure 4 a fly fan 22 is shown.

In order to prevent the traversing movement of the screen carrier across the aperture when "still" slides are being shown a brake 49 or some equivalent retaining device (see Figures 16 and 17) is located so as to prevent rotation of the governor 21 or fly fan 22 when so desired by the lantern operator.

Figure 3:
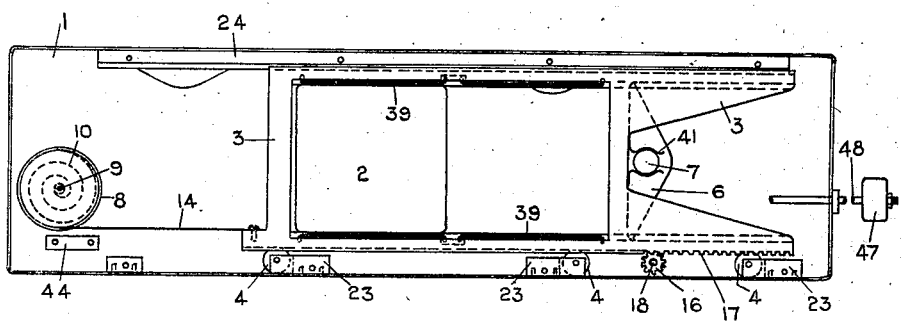
Figure 3 shows an interior view of Figure 1 with the front cover removed.

In Figures 3 and 6 showing interior views of the machines the screen carrier 3 and the glass screen 6 are clearly shown. 44 is a stop to prevent overtravel of the screen carrier 3. The rollers 4 are shown mounted in suitable supports 23. The upper part of the screen carrier 3 is maintained in alignment by the guide 24. This guide 24 can be seen more clearly in Figure 9.

The slide carrier 25 which would normally show behind the screen carrier 6 in Figures 3 or 6 has been purposely omitted for the sake of clearness, but the operating knob 47 that moves the slide carrier 25 is shown. The teeth in rack 17 and the pinion 16 are clearly indicated.

Figure 7 shows an interior view of a similar nature to that shown in Figures 3 and 6. In Figure 7 the screen carrier is omitted. In Figures 3 and 6 the slide carrier is omitted. This has been done in each case for the sake of clearness.

In Figure 7 the slide carrier 25 is of the usual two celled type, and is supported by and slides upon an adjustable bottom guide 26. At the top the slide carrier 25 is held in alignment by the guide 27. This guide can be more clearly seen in Figure 9.

The slide carrier 25 has an extension 37 and knob 47 for the purpose of moving the slide carrier 25 to and fro in the usual manner to enable the slides to be placed therein.

Slide carrier 25 has suitably attached to it a pawl 28 mounted on an arbor 29 and controlled by a helical or other spring 30. A detent 31 is so placed as to engage the pawl 28 and remove it from contact with the screen carrier 3.

Hitherto means of adjusting the parallelism of the lines upon the slides with those upon the screen has been effected by altering the plane upon which the screen carrier 3 slides. In my invention the guide bar 26 supporting the slide carrier 25, is pivoted at the point 32, which is located on the vertical centre line through aperture 2. By placing the centre about which the guide bar 26 is movable in the position shown, less movement of the bar 26 is required to render the two sets of lines parallel, and the adjustment can therefore be more rapidly effected by the lantern operator. The guide bar 26 is maintained in alignment at each end by blocks 33, which permit a free movement of the bar 26 in a vertical direction. A spring 34 is so fitted as to press the guide bar 26 down firmly on to adjusting screw 35, carried in nut 36 attached to case 1.

A flexible cord 38, for example a light Bowden wire, is attached to screw 35 of a convenient length to reach the lantern operator's hand so that he can make adjustments to bring the lines on the slide and on the screen into parallel while he is viewing the picture shown by the slide upon the theatre screen. The end of the flexible cord 38 may be fitted with a suitable handle for this purpose. Springs 39 or their equivalent are attached to the screen carrier 3 to maintain the transparent opaque lined screen 6 in the position shown in Figure 9. Springs 40 or their equivalent are fitted to the slide carrier cells to maintain the slides in the position shown in Figure 9. A detent spring 41 is attached to the screen carrier so arranged as to spring on to the attachment 7 on the screen and maintain the screen in the working position, viz. when animated or dissolving pictures are being shown, the spring 44 however, permits the screen being moved clear of the aperture 2 when the lantern operator so desires as previously explained herein.

The operation of the machine is as follows. At the conclusion of the exhibition of "still" picture slides or when so desired the lantern operator places "animated" picture slides in the two cells of the slide carrier 25, pushes the screen 3 and the slide carrier 25 into the positions shown in the several figures. The springs 10 in either form of the apparatus having been wound and the brake 50 released the screen carrier 3 will commence to move slowly to the left across the slide being shown through aperture 2. The screen carrier 3 is so timed by the governor 21 or 22 or other means that about one and a quarter minutes are required to effect the full travel of the screen carrier 3. An advertising picture is usually shown for a period of from ten to twenty seconds. At the end of the showing the slide carrier 25, is moved from right to left to exhibit the slide in the right hand cell upon the picture theatre screen, the screen carrier 3 and screen 6 still continuing to move to the left. After the expiration of another similar period of ten to twenty seconds the slide carrier 25 is moved to the right for inserting another slide into the right hand cell of the slide carrier 25 through the opening 46. When this movement of slide carrier 25 to the right takes place the pawl 28 slides along the screen carrier 3 until it engages with notch 42 (see Figure 8) on the back of the screen carrier 3 and so carries the screen carrier 3 back to the right hand position which it occupied at the commencement of the cycle of operation. During this movement the detent 31 comes into action and disengages the pawl 28 from the screen carrier 3, when the screen carrier 3 again automatically starts its movement to the left.

In the machine shown in Figure 1 the movement of the screen carrier to the right winds up the spring 10 in barrel 8 and in this form of the invention an occasional rewinding of the motor spring 10 by means of a key is not necessary. In the other form of my invention (Figure 4) the motor is maintained wound up by the occasional use of a key 13 and in order that the screen carrier 3 can be drawn to the right without reversing the motion of the gear train in the motor a clutch of the friction type 43 (similar to a friction clutch that allows the hands of a clock to be adjusted) connects the arbor 18 on which the pinion 16 is fixed to the first wheel of the gear train, thus allowing the wheel to slip on the arbor 18 on the return stroke of the slide carrier 3. The frictional contact of the clutch is maintained at sufficient tension to enable the motor to drive the screen carrier 3 when moving the screen carrier to the left.

In those cases where it may be found preferable to use some other means of driving the screen carrier, other than a spring wound motor, say for example an electric motor. In this case the speed of the electric motor would be reduced to that required by any well known means, and the arbor driving the pinion 16 would be connected thereto through a slipping friction clutch, arranged with frictional contact sufficient to operate the screen carrier and at the same time permit of the return of the screen carrier when pulled to the right by the slide carrier and pawl 28.

I claim:—

1. A device of the character described comprising a frame, a transparent screen element having opaque parallel lines formed thereon, a transparent lantern slide having pictures formed thereon in opaque parallel lines adapted to register with the parallel lines of said screen, a motor driven carrier device supported on said frame for holding said opaque lined screen for movement transversely of said lines of said screen, a cellular movable slide holder supported by said frame for holding said transparent lantern slides with their opaque lines in parallel relationship with the opaque lines of said screen, means including a motor for automatically moving said screen relative to said slide whereby movement in the picture projected from said screen and slide is produced, and means carried by said slide holder adapted to engage said screen carrier when said slide holder is shifted in a direction opposite to that which the motor imparts to the screen holder for displacing said screen holder in said opposite direction.

2. A device of the character described comprising a frame, a transparent screen element having opaque parallel lines formed thereon, a transparent lantern slide having pictures formed thereon in opaque parallel lines adapted to register with the parallel lines of said screen, a motor driven carrier device supported on said frame for holding said opaque lined screen for movement transversely of said lines of said screen, a cellular movable slide holder supported by said frame for holding said transparent lantern slides with their opaque lines in parallel relationship with the opaque lines of said screen, means including a spring driven motor for automatically moving said screen relative to said slide whereby movement in the picture projected from said screen and slide is produced, and means carried by said slide holder adapted to engage said screen carrier when said slide holder is shifted in a direction opposite to that which the motor imparts to the screen holder for displacing said screen holder in said opposite direction and winding said spring motor.

3. A device of the character described comprising a frame, a transparent screen element having opaque parallel lines formed thereon, a transparent lantern slide having pictures formed thereon in opaque parallel lines adapted to register with the parallel lines of said screen, a motor driven carrier device supported on said frame for holding said opaque lined screen for movement transversely of said lines of said screen, a cellular movable slide holder supported by said frame for holding said transparent lantern slides with their opaque lines in parallel relationship with the opaque lines of said screen, means including a spring driven motor for automatically moving said screen relative to said slide whereby movement in the picture projected from said screen and slide is produced, means carried by said slide holder adapted to engage said screen carrier when said slide holder is shifted in a direction opposite to that which the motor imparts to the screen holder for displacing said screen holder in said opposite direction and winding said spring motor, and a friction drive included in said spring motor to enable said screen carrier to be displaced in a direction opposite to that imparted by the motor without reversing the motor.

4. A lantern slide dissolving view apparatus for producing movement in a picture upon a screen from a still slide comprising a frame, a transparent screen element having parallel opaque lines formed thereon, a carrier in said frame for holding said transparent screen element, a transparent lantern slide having pictures formed thereon in opaque parallel lines adapted to register with the parallel lines of said transparent screen, a cellular receptacle for said slides movably mounted in said frame, a governed motor for moving said screen carrier in one direction across the slide, and means carried by said movable slide receptacle for moving said screen carrier in the opposite direction.

5. A lantern slide dissolving view apparatus for producing movement in a picture upon a screen from a still slide comprising a frame, a transparent screen element having parallel opaque lines formed thereon, a carrier in said frame for holding said transparent screen element, a transparent lantern slide having pictures formed thereon in opaque parallel lines adapted to register with the parallel lines of said transparent screen, a cellular receptacle for said slides movably mounted in said frame, a governed motor for moving said screen carrier in one direction across the slide, said screen carrier having a notch provided therein, and a pawl carried by said slide receptacle adapted to engage the notch in said screen carrier to return the latter to a position from which it is moved by said motor upon shifting of said receptacle in one direction.

6. A lantern slide dissolving view apparatus for producing movement in a picture upon a screen from a still slide comprising a frame, a transparent screen element having parallel opaque lines formed thereon, a carrier in said frame for holding said transparent screen element, a transparent lantern slide having pictures formed thereon in opaque parallel lines adapted to register with the parallel lines of said transparent screen, a cellular receptacle for said slides movably mounted in said frame, a toothed rack mounted on said screen carrier, a pinion meshing with said rack, a governed motor, a friction drive between said motor and pinion for driving said screen carrier in one direction relative to said slide, and means carried by said movable slide receptacle for moving said screen carrier in the opposite direction.

7. A lantern slide dissolving view apparatus for producing movement in a picture upon a screen from a still slide comprising a frame, a transparent screen element having parallel opaque lines formed thereon, a carrier in said frame for holding said transparent screen element, a transparent lantern slide having pictures formed thereon in opaque parallel lines adapted to register with the parallel lines of said transparent screen, a cellular receptacle for said slides movably mounted in said frame, a spring motor, a drum rotated by said motor, a tape having one end secured to said drum and the other end attached to said screen carrier whereby said motor will cause said screen carrier to move relative to said slide, means carried by said slide receptacle to move said screen carrier in a direction opposite to that which it is shifted by said motor, and means operable by the displacement of the screen carrier by the receptacle for winding said spring motor.

8. A lantern slide dissolving view apparatus for producing movement in a picture upon a screen from a still slide comprising a frame, a transparent screen element having parallel opaque lines formed thereon, a carrier in said frame for holding said transparent screen element, a transparent lantern slide having pictures formed thereon in opaque parallel lines adapted to register with the parallel lines of said transparent screen, a cellular receptacle for said slides movably mounted in said frame, a governed motor for moving said screen carrier in one direction across the slide, means carried by said movable slide receptacle for moving said screen carrier in the opposite direction, said transparent screen being shiftable in said screen carrier, and means for resiliently retaining said screen in a fixed position in said carrier.

9. A lantern slide dissolving view apparatus for producing movement in a picture upon a screen from a still slide comprising a frame, a transparent screen element having parallel opaque lines formed thereon, a carrier in said frame for holding said transparent screen element, a transparent lantern slide having pictures formed thereon in opaque parallel lines adapted to register with the parallel lines of said transparent screen, a cellular receptacle for said slides movably mounted in said frame, a governed motor for moving said screen carrier in one direction across the slide, means carried by said movable slide receptacle for moving said screen carrier in the opposite direction, a movable guide pivoted near the center line of the light aperture of said casing for supporting said slide receptacle, a spring urging said guide in one direction about said pivot, and a screw for adjusting the limit of the movement of said guide under the action of said spring to properly align the lines on said slide with those on the screen.

10. A lantern slide dissolving view apparatus for producing movement in a picture upon a screen from a still slide comprising a frame, a transparent screen element having parallel opaque lines formed thereon, a carrier in said frame for holding said transparent screen element, a transparent lantern slide having pictures formed thereon in opaque parallel lines adapted to register with the parallel lines of said transparent screen, a cellular receptacle for said slides movably mounted in said frame, a governed motor for moving said screen carrier in one direction across the slide, said screen carrier having a notch provided therein, a pawl carried by said slide receptacle adapted to engage the notch in said screen carrier to return the latter to a position from which it is moved by said motor upon shifting of said receptacle in one direction, and means for disengaging said pawl from said notch at the end of travel of said receptacle.

11. A device of the character described comprising a frame, a transparent screen element having opaque parallel lines formed thereon, a transparent lantern slide having pictures formed thereon in opaque parallel lines adapted to register with the parallel lines of said screen, a motor driven carrier device supported on said frame for holding said opaque lined screen for movement transversely of said lines of said screen, a cellular movable slide holder supported by said frame for holding said transparent lantern slides with their opaque lines in parallel relationship with the opaque lines of said screen, means including a motor for automatically moving said screen relative to said slide whereby movement in the picture projected from said screen and slide is produced, means carried by said slide holder adapted to engage said screen carrier when said slide holder is shifted in a direction opposite that which the motor imparts to the screen holder for displacing said screen holder in said opposite direction, and a friction drive included between the motor and the screen carrier to enable said screen carrier to be displaced in a direction opposite that imparted by the motor without reversing the motor.

12. A lantern slide dissolving view apparatus for producing movement in a picture upon a screen from a still slide, comprising a frame, a transparent screen element having parallel opaque lines formed thereon, a carrier in said frame for holding said transparent screen element, a transparent lantern slide having pictures formed thereon in opaque parallel lines adapted to register with the parallel lines of said transparent screen, a cellular receptacle for said slides movably mounted in said frame, a spring motor, a drum rotated by said motor, a tape having one end secured to said drum and the other end attached to said screen carrier whereby said motor will cause said screen carrier to move relative to said slide, a governor device operated by said screen carrier, means carried by said slide receptacle to move said screen carrier in a direction opposite that to which it is shifted by said motor, and means operable by the displacement of the screen carrier by the receptacle for winding said spring motor.

ARTHUR WILLIAM TOURNAY-HINDE.